Figure 1:
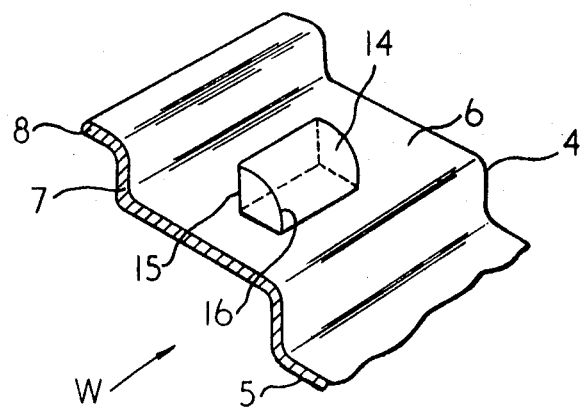

United States Patent
Poyner

[15] 3,664,405
[45] May 23, 1972

[54] WHEELS

[72] Inventor: James Poyner, Burntwood, England

[73] Assignee: The Dunlap Holdings Limited, London, England

[22] Filed: June 17, 1970

[21] Appl. No.: 47,093

[30] Foreign Application Priority Data

Jan. 10, 1970 Great Britain..........................1,311/70

[52] U.S. Cl..............................152/375, 152/379, 152/386
[51] Int. Cl..........................................................B60b 25/00
[58] Field of Search..........................152/375–384, 386–401

[56] References Cited

UNITED STATES PATENTS

| | | |
|---|---|---|
| 3,229,744 | 1/1966 | Bradley..............................152/398 |
| 2,198,978 | 4/1940 | Sauer..................................152/381 |
| 2,409,666 | 10/1946 | Comey................................152/399 |
| 3,451,457 | 6/1969 | Leyer..................................152/158 |
| 1,652,146 | 12/1927 | Michelim............................152/381 |

*Primary Examiner*—Arthur L. La Point
*Assistant Examiner*—D. W. Keen
*Attorney*—Stevens, Davis, Miller & Mosher

[57] ABSTRACT

A wheel for a pneumatic tire, particularly for use on racing cars, provided with at least one localized projection axially inwards of the wheel rim for preventing axially inwards displacement of the tire bead from the wheel rim flange and into the wheel well. Preferably the projections are members welded to the rim and formed with axially outward tire bead toe abutment faces and axially inwards sloping faces to assist tire fitting.

6 Claims, 2 Drawing Figures

WHEELS

This invention relates to wheels and more particularly to wheels having wide rim flange interspacing for use at high speeds, for example, racing motor car wheels.

Pneumatic tires, during use, occasionally suffer from an axial movement of the tire bead away from the wheel rim flange. This movement may be sufficient for the bead to move off the wheel rim seat for the tire bead and into the wheel well presenting a serious hazard to safety. This problem becomes increasingly more apparent at higher speeds and also at wider rim flange interspacing. It also arises when the tires are run at pressures below normal and in cases of complete loss of air pressure. The problem is accentuated by tires having, as moulded, a concave tread such that upon inflation the tread is substantially flattened across the tire, for the inflation forces in such a tire construction result in a bead detaching force.

According to the invention there is provided a wheel for supporting a pneumatic tire comprising a rim having a pair of circumferentially extending rim flanges in axially spaced apart relationship, rim seats for seating the bead base portions of the tire and at least one localized projection on at least one of the rim seats, spaced apart from the rim flange, said projection being provided with an abutment face for engaging the toe of a tire bead, thereby preventing substantial axial displacement of the tire bead from its associated rim flange during the use of the wheel.

Preferably the or each projection comprises a member preferably permanently formed with or secured to the rim seat and having a radially extending axially outer bead toe abutment face and a sloping axially inner face to assist tire fitting.

The wheel may be provided with either one projection on one rim seat, or two projections, one on each rim seat, the or each projection acting in cooperation with a wide rim seat to retain the tire bead in position.

Figure 2:
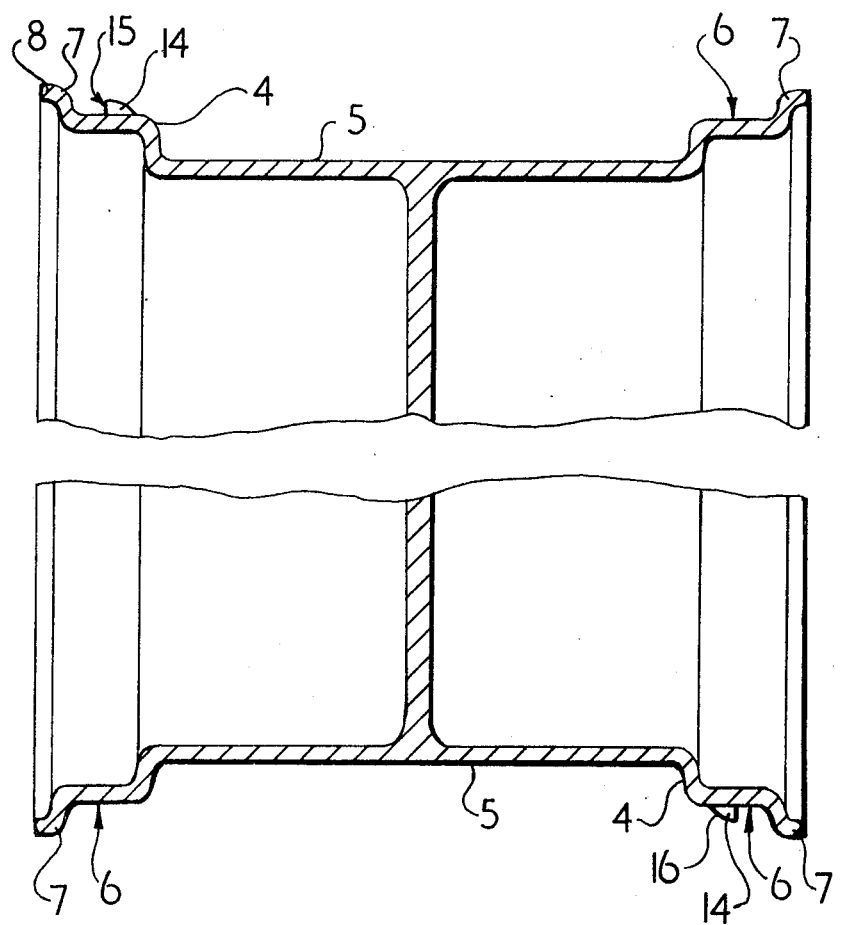

One embodiment of the invention will now be described by way of example only and is illustrated in the accompanying drawings in which FIG. 1 is a perspective view of part of a wheel rim provided with a tire retaining projection and FIG. 2 is an axial section through a wheel having two diametrically opposed tire retaining projections.

As shown in the drawing the wheel W is formed with a rim 4 having a well 5 formed therein between two rim seats 6. The edges of the rim are provided with rim flanges 7 having rolled extremities 8.

Two projections 14 are provided, (only one projection shown in the drawing) one welded to each rim seat 6, in diametrically opposed relationship with respect to the wheel.

Each projection 14 is located in axially spaced apart relationship with the rim flange 7, the spacing between flange and projection being slightly greater than the width of the tire bead to be accommodated. The axially outer face 15 of the projection is substantially perpendicular to the rim seat and the axially inner face 16 of the projection slopes in a curve towards the rim seat 6. It will be noted that the face 15 for engagement with a bead toe provides a substantially large circumferentially extending length to secure the bead. The length of the face is preferably in the range 2 inches to 4 inches.

The wheel rim 4 is provided with rim seats 6 of a width greater than that usually required and the width is about 2 inches in the use of a 15 × 15 inch racing car wheel.

In use of the tire and wheel the tire bead is retained by the axially outer face 15 of the projection 14 abutting the tire bead and the wide seat prevents even the portion of the tire bead diametrically opposite to the projection reaching the wheel well.

Fitting of the tire to the rim is carried out in the usual manner and the tire bead is raised over the projection 14 along the sloping portion 16.

Having now described my invention, what I claim is:

1. A wheel for supporting a pneumatic tire comprising a rim; a pair of circumferentially-extending rim flanges in axially spaced-apart relationship; rim seats for seating the bead base portions of the tire; two localized projections, one on each rim seat, each projection being axially spaced apart from its associated rim flange and diametrically opposed to the other projection with respect to the wheel, a bead toe abutment face being provided on each projection for engagement with the toe of a tire bead thereby preventing substantial axial displacement of the tire bead from its associated rim flange during use of the wheel.

2. A wheel according to claim 1 wherein the abutment face is substantially perpendicular to the rim seat.

3. A wheel according to claim 1 wherein an axially inner sloping face is formed on the projection to assist tire fitting.

4. A wheel according to claim 1 wherein the axial width of the rim seats is substantially wider than the axial distance between each projection and its associated rim flange whereby any part of either tire bead is prevented from leaving the rim seats in use of the wheel.

5. A wheel according to claim 1 wherein the two projections are each welded to the wheel rim.

6. The wheel of claim 1 in which each localized projection extends circumferentially a distance of not more than 20 percent of the rim circumference.

* * * * *

FO-1050
(5/69)

UNITED STATES PATENT OFFICE
CERTIFICATE OF CORRECTION

Patent No. 3,664,405             Dated   May 23, 1972

Inventor(s)   James Poyner

It is certified that error appears in the above-identified patent and that said Letters Patent are hereby corrected as shown below:

The Assignee should read --DUNLOP HOLDINGS LIMITED--.

Signed and sealed this 26th day of December 1972.

(SEAL)
Attest:

EDWARD M.FLETCHER,JR.                ROBERT GOTTSCHALK
Attesting Officer                    Commissioner of Patents